United States Patent [19]
Fish et al.

[11] Patent Number: 5,875,333
[45] Date of Patent: Feb. 23, 1999

[54] AUTOMATICALLY GENERATING SOURCE CODE FOR RELATING A DIALOG INTERFACE WITH A BUSINESS OBJECT IN A COMPUTING APPLICATION

[75] Inventors: Nathan S. Fish, Plano; Andrew J. Berner, Irving; Sarah V. Denney, Allen, all of Tex.

[73] Assignee: Electronic Data Systems Corporation, Plano, Tex.

[21] Appl. No.: 660,353

[22] Filed: Jun. 7, 1996

[51] Int. Cl.$^6$ ....................................................... G06F 9/44
[52] U.S. Cl. .......................... 395/702; 345/333; 345/335; 345/347; 395/701
[58] Field of Search ..................................... 345/333, 334, 345/335, 347; 395/682, 701, 702, 703

[56] References Cited

U.S. PATENT DOCUMENTS

| | | | |
|---|---|---|---|
| 5,438,659 | 8/1995 | Notess et al. | 395/155 |
| 5,495,567 | 2/1996 | Iizawa et al. | 395/161 |
| 5,583,982 | 12/1996 | Matheny et al. | 395/326 |
| 5,699,310 | 12/1997 | Garloff et al. | 395/701 |
| 5,710,926 | 1/1998 | Maurer | 395/701 |

*Primary Examiner*—James P. Trammell
*Assistant Examiner*—Kakali Chaki
*Attorney, Agent, or Firm*—L. Joy Griebenow

[57] ABSTRACT

A method and a system (10) are provided for generating source code (28) for relating a dialog interface with a business object in a computing application. The system (10) includes a memory (14, 18) operable to store an attribute definition file (16). An interface (12) is coupled to the memory (14, 18). The interface (12) allows a user of the system (10) to create an application configuration file (19) from the attribute definition file (16). A processor (24), which is coupled to the memory (14, 18) and the interface (12), automatically generates source code (28) in response to the application configuration file (19) to relate the dialog interface with the business object. The method is performed on a computer system, such as the system (10) of the present invention. The method includes receiving configuration information specifying a relationship between at least one interface object and at least one business object which is represented by the interface object. Source code is automatically generated from the configuration information. The source code relates the interface object with the business object.

23 Claims, 4 Drawing Sheets

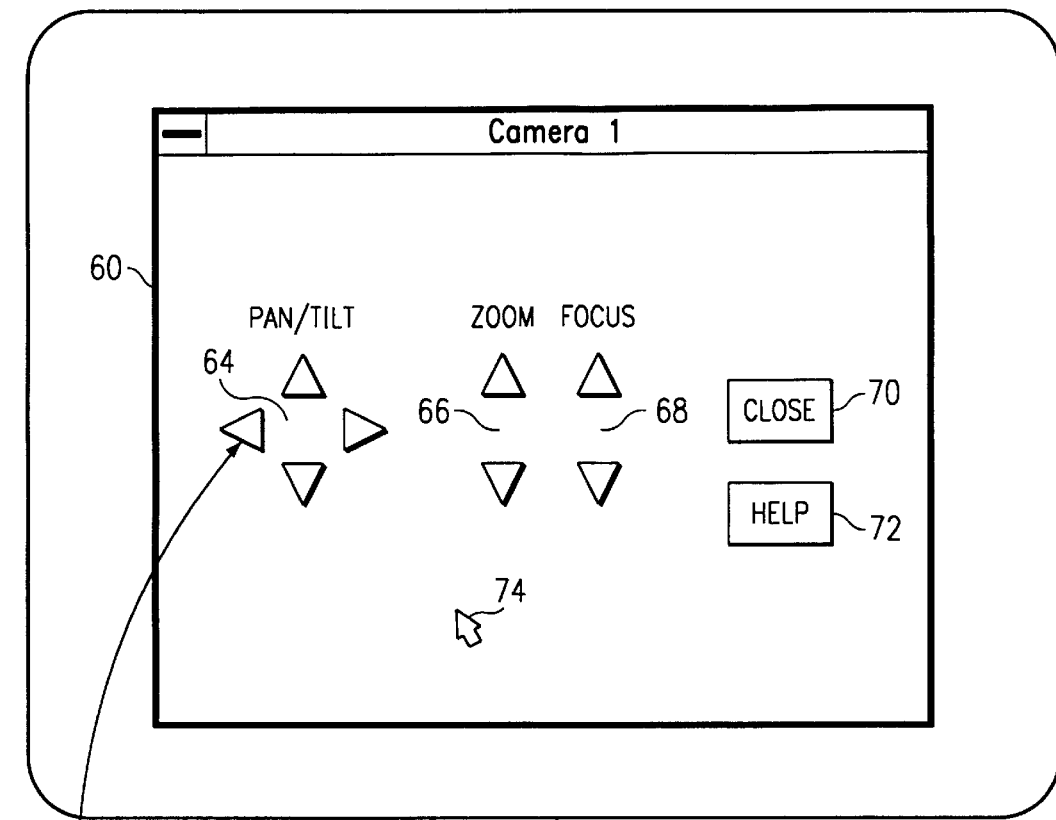
FIG. 2A
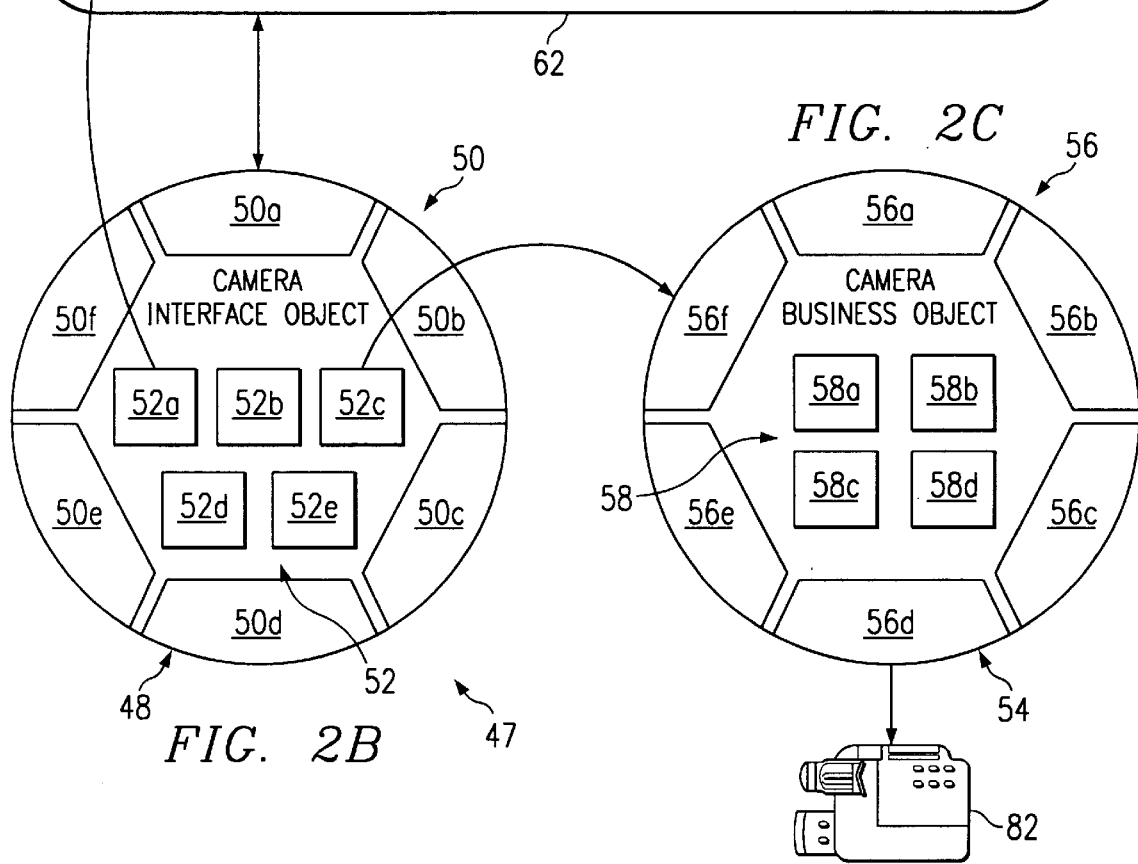
FIG. 2B
FIG. 2C

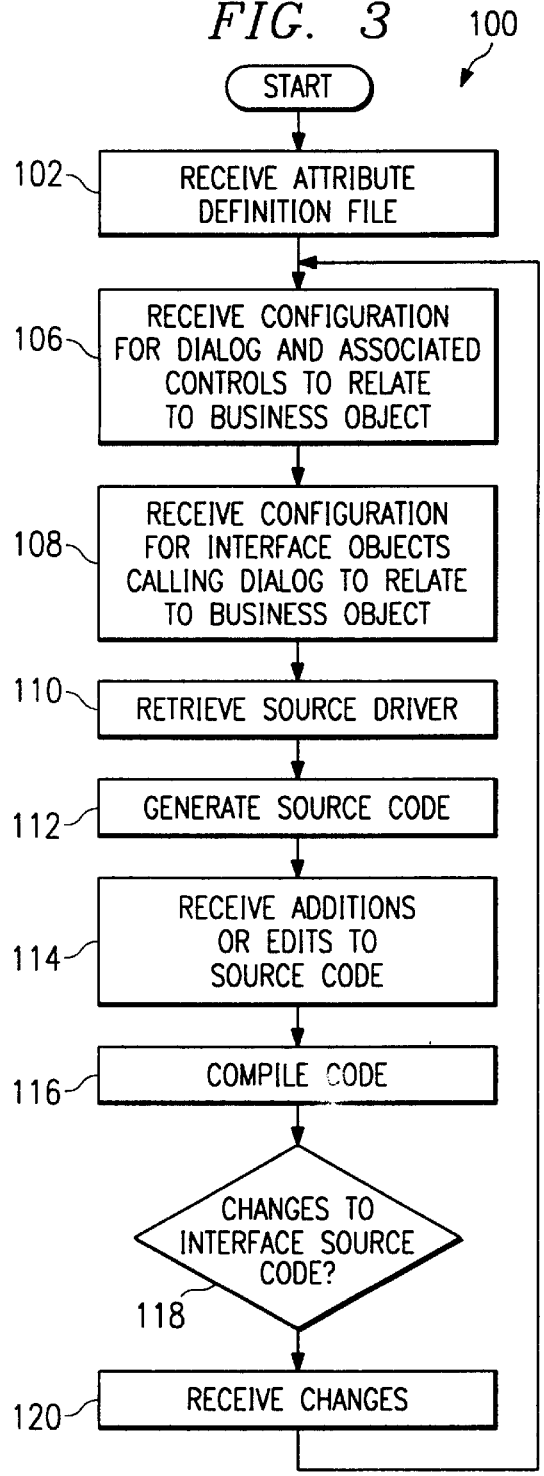
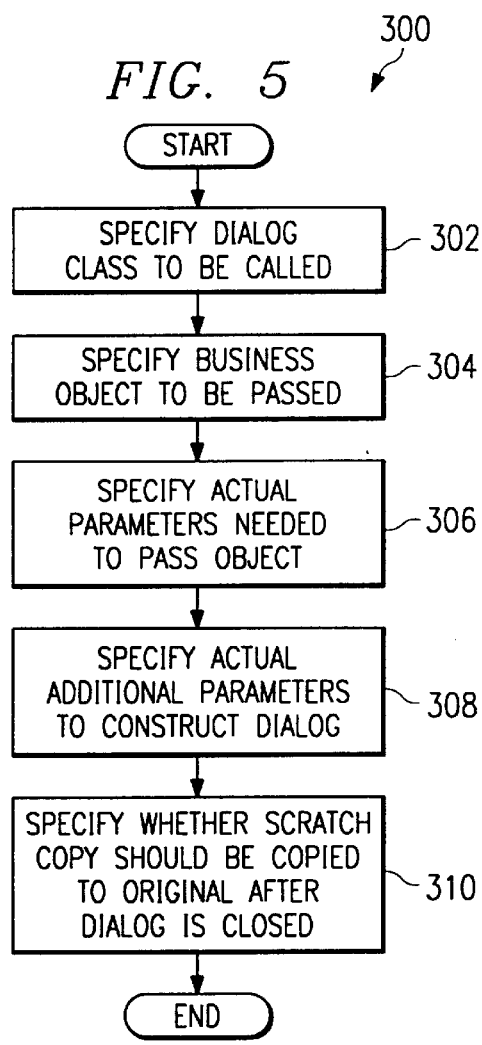

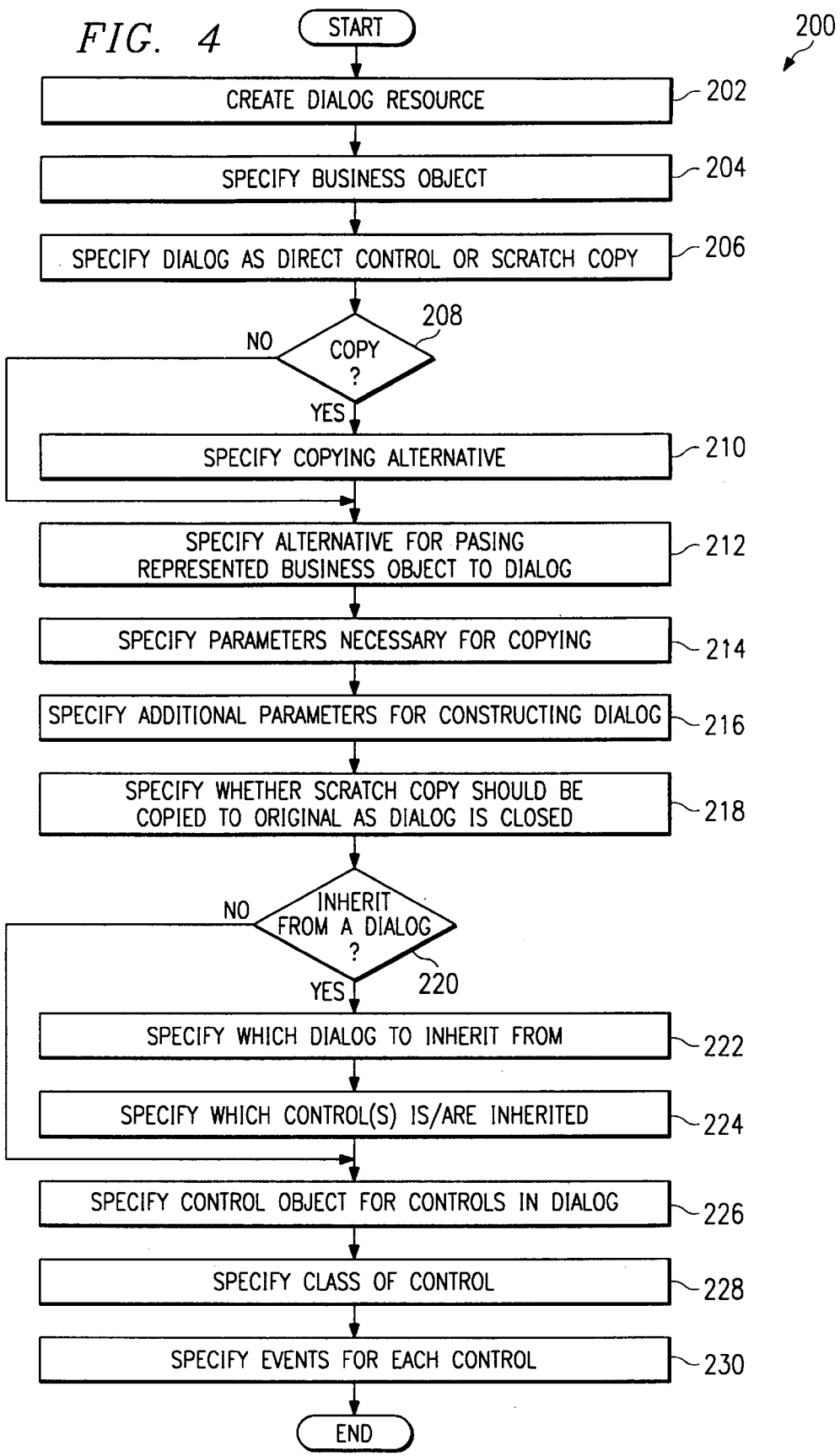

5,875,333

AUTOMATICALLY GENERATING SOURCE CODE FOR RELATING A DIALOG INTERFACE WITH A BUSINESS OBJECT IN A COMPUTING APPLICATION

TECHNICAL FIELD OF THE INVENTION

This invention relates in general to the field of software development, and more particularly to generating source code for relating a dialog interface with a business object in a computing application.

BACKGROUND OF THE INVENTION

A computer system may be used to perform a specific set of functions for any number of applications, such as an accounting system, a video production system, a hazardous chemical monitoring system, a docketing system, or a tracking system. For any computing application, software source code must be developed.

One software development method is object-oriented programming. In many object-oriented programs, two types of objects must be developed: interface objects and business objects. Interface objects, such as windows, dialogs, list boxes, menus, and buttons, allow a user of a computing application to interact with the application for any of a variety of reasons, such as to retrieve or view information, enter data, and give commands to the application. Business objects represent objects or items which are controlled or managed by the computing application. For example, in an application for an accounting system, business objects may represent an accounting entry, an asset, a liability, an account, or an interest payment. In addition, business objects may also represent actions that can be performed on a item. For example, in a computing application for a video production system, a business object may include the action of directing a video camera to zoom in on a scene. The interface objects with which a human operator interacts (e.g., a button on a dialog box) must then be related to the actions of the business objects (e.g., zooming a camera).

The process of manually producing source code for business and interface objects is time-consuming and inefficient. For example, to construct a dialog (an interface object) that requires or uses information relating to a business object, the human coder or programmer must include multiple parameters in an appropriate order in all declarations, definitions, and calls where that dialog is used. Otherwise, the source code will not function as desired. Furthermore, even when the human programmer is consistent in the use of declarations and definitions for one version of source code, consistency cannot be guaranteed for other versions. Specifically, if a declaration or definition is changed, the human programmer is required to manually change the declaration or definition throughout all sections of the source code.

Various software programs, commonly referred to as code generators, have been developed to facilitate the generation of source code for computing applications, thereby increasing the efficiency of a human programmer and improving the accuracy of the source code. Many code generators allow the programmer to develop interface resources, and to provide information about the links among interface objects, such as, for example, linking a specific dialog to a button so that the dialog appears when the button is "pressed" by a user of the computing application. One such code generator is ObjectDesigner™, available from ImageSoft Corporation, Port Washington, N.Y. Such code generators do not provide a way for the human programmer to provide information about the business objects associated with the dialogs. Because the source code generated by prior code generators does not include such information, the utility of the source code is limited.

SUMMARY OF THE INVENTION

There exists a need for a source code generator that generates source code for interface objects of a computing application, including the source code that relates the interface objects to the business objects of the application. In accordance with the present invention, the disadvantages and problems associated with generating source code for an application have been substantially reduced or eliminated.

In accordance with one embodiment of the present invention, a method performed on a computer system is provided for automatically generating source code for a computing application. The method includes receiving configuration information specifying a relationship between at least one interface object and at least one business object which is represented by the interface object. Source code is automatically generated from the configuration information. The source code relates the interface object with the business object.

In accordance with another embodiment of the present invention, a system is provided for generating source code for relating a dialog interface with a business object in a computing application. The system includes a memory operable to store an attribute definition file. An interface is coupled to the memory. The interface allows a user of the system to create an application configuration file from the attribute definition file. A processor, which is coupled to the memory and the interface, automatically generates source code in response to the application configuration file to relate the dialog interface with the business object.

A technical advantage of the present invention includes providing a systematic method for a programmer to specify a plurality of attributes to relate one or more dialog boxes and associated controls to one or more business objects. A variety of options are available for each attribute. Consequently, the programmer is provided with a large amount of flexibility to specify how an interface object should represent a business object, and a broad range of source code can be generated accordingly. Thus, the advantages of generated source code for accuracy and for maintenance can be realized in a wide variety of computing applications.

BRIEF DESCRIPTION OF THE DRAWINGS

For a more complete understanding of the present invention and further features and advantages, reference is now made to the following description taken in conjunction with the accompanying drawings, in which:

FIG. 2 illustrates interface and operational features for an exemplary computing application as implemented by relating a dialog interface to a business object within the application;

FIG. 3 illustrates a high level flow chart of a method for generating source code for relating a dialog interface with a business object in a computing application according to an embodiment of the present invention;

FIG. 4 illustrates a flow chart of a method for configuring an interface dialog and one or more associated controls within the dialog; and FIG. 5 illustrates a flow chart of a method for configuring interface objects for calling an interface dialog related to a business object.

DETAILED DESCRIPTION OF THE INVENTION

Figure 1:
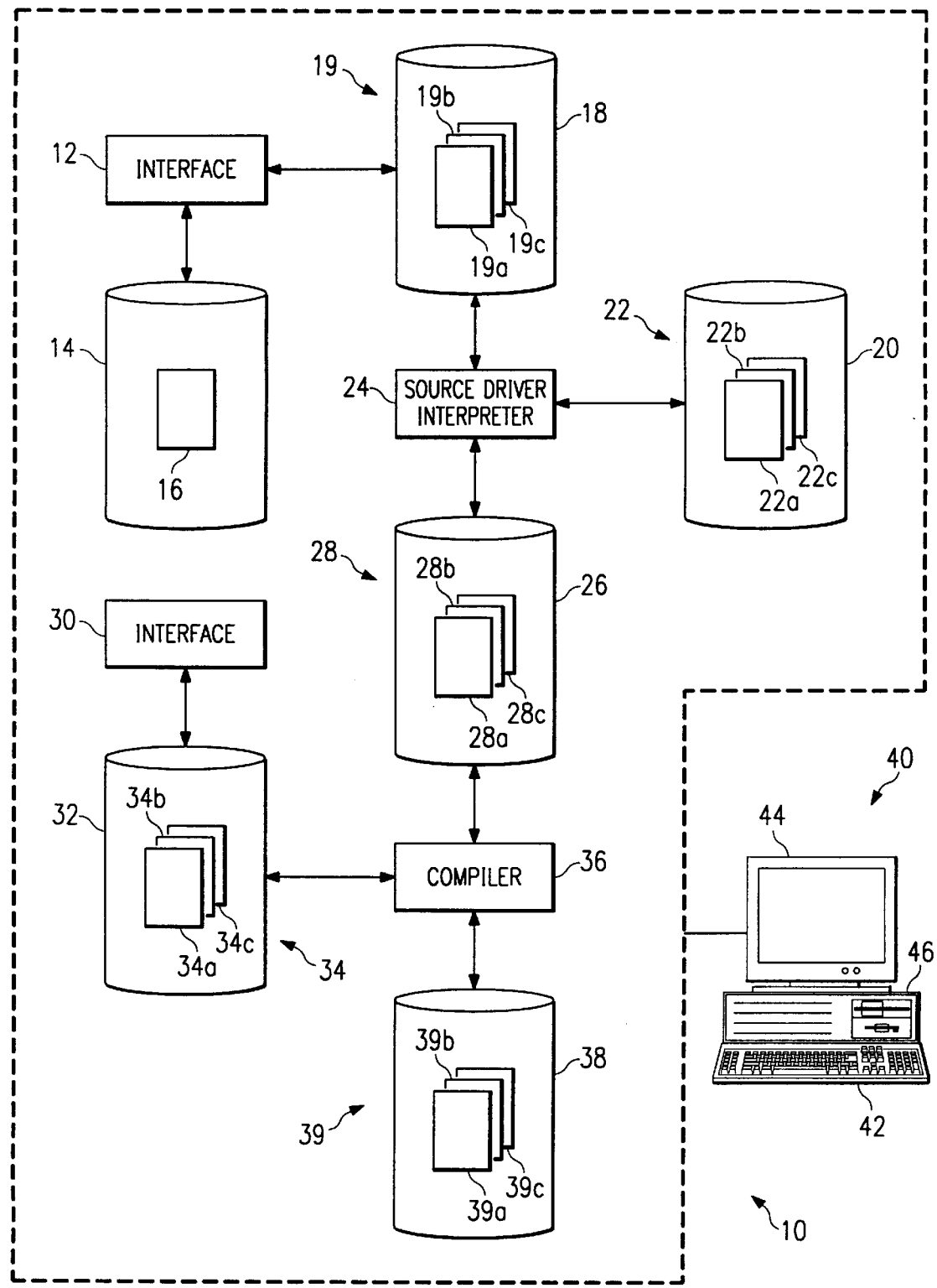
FIG. 1 illustrates a high level schematic diagram of a system for generating source code for relating a dialog interface with a business object in a computing application according to an embodiment of the present invention.

FIG. 1 illustrates a high level schematic diagram of one embodiment of the system of the present invention which includes a system 10 for generating source code for a computing application.

The computing application can be any type of application, such as a spreadsheet, a database, a word processor, a game, an accounting system, a video production system, a tracking system, a hazardous chemical monitoring system, or the like, having operational aspects that can be performed on a computer. The operational aspects can be tied to one or more business objects. Each business object may represent an item on which an operation is performed by the computing application. For example, in an application for an accounting system, business objects may represent an accounting entry, an asset, a liability, an account, or an interest payment. In an application for a video production system, the business object can represent a camera, a video cassette recorder, a video monitor, or a laser disc player. In an application for a hazardous chemical monitoring system, the business objects can represent a safety valve, a monitor, an alarm, or a switch. The operation may be controlling, directing, routing, or any other suitable operation. For example, a computing application for a video production system may direct a video camera to zoom in on a scene.

The computing application may also require that a human operator be able to interact with the application for any number of reasons, such as to input, retrieve, or view information. In order for the human operator to interact, the computing application must include one or more interfaces, such as a dialog. A dialog is an interactive screen, comprising associated input boxes and other controls, that is displayed on a Windows™-type interface. Each dialog interface may be associated with one or more business objects, thereby allowing the control of the business object through the dialog interface.

Because the computing application includes both operational and interface aspects, the source code for the computing application may comprise both interface source code and operational source code. The interface source code enables interaction between the computing application and the operator. The operational source code enables the computing application's operational aspects. According to the present invention, system 10 can generate source code for relating a dialog interface with a business object in the computing application.

System 10 includes a first interface 12 through which a user can interface with system 10 to input or edit information relating to one or more interface or business objects in various computing applications. The functionality of first interface 12 may be performed by one or more suitable input devices, such as a keypad, touch screen, or other device that can accept information, and one or more suitable output devices, such as a computer display, for conveying information associated with the operation of system 10, including digital data, visual information, or audio information. Various interface objects may be associated with or represent various business objects. First interface 12 functions to receive an attribute definition file 16. First interface 12 also allows a user of system 10 to produce an application configuration file 19 for a computing application so that source code for one or more interface objects representing business objects can be generated from the application configuration file.

An attribute definition file memory 14 is coupled to first interface 12. Attribute definition file memory 14 can reside in a suitable storage medium, such as RAM, ROM, disk, tape storage, or other suitable volatile or non-volatile data storage system. Attribute definition file memory 14 receives and store the attribute definition file 16. Generally, attribute definition file 16 contains attributes and choices that are used by system 10 to configure dialog boxes and calls to the dialog boxes, according to the present invention. Attribute definition file memory 14 may contain information relating to the kinds of objects for which source code can be generated (e.g., windows, dialogs, controls, and functions), the attributes which the programmer can specify about those objects, and the options from which the programmer can choose in specifying the attributes.

Using the information stored in attribute definition file memory 14, a user of system 10, via first interface 12, can create one or more application configuration files 19a through 19c. In particular, certain attributes of one or more dialog boxes, their associated controls, the associated business objects, and any interfaces calling the dialog boxes can be specified. Each application configuration file 19 comprises encoded information which can be used by a source code driver to generate source code.

These application configuration files 19 can be stored in an application configuration file memory 18. Application configuration file memory 18 can reside in a suitable storage medium, such as RAM, ROM, disk, tape storage, or other suitable volatile or non-volatile data storage system. A separate application configuration file 19 can be produced and maintained for each computing application for which system 10 generates source code. For example, application configuration files 19a, 19b, and 19c may correspond to the applications for an automated accounting system, a video production system, and a hazardous chemical monitoring system, respectively. Each application configuration file 19 may comprise one or more objects and choices of attributes, according to the types of objects and the choices of attributes (for each of those objects) allowed by the attribute definition file 16 for a particular application. For example, the application configuration file 19 for a particular application may specify the name of each dialog in the application, the business object represented by each dialog, how the business object is to be represented in the dialog, and the interface elements that call each dialog.

A source code driver memory 20 contains one or more source code drivers 22a through 22c. Like attribute definition file memory 14 and application configuration file memory 18, source code driver memory 20 can reside in a suitable storage medium, such as RAM, ROM, disk, tape storage, or other suitable volatile or non-volatile data storage system. The source code drivers 22 are source files utilizing source driver language to control the generation of source code in various programming languages, such as Borland $C^{++}$. Source code drivers 22 implement the invention based upon choices specified in the application definition file 16. At least some of these source code drivers 22 can be used for automatically generating source code in response to an application configuration file 19 to relate a dialog interface with its associated business object. Typically, in order to generate the source code for a particular computing application, a plurality of source code drivers 22 are used.

A source driver interpreter 24 is coupled to application configuration file memory 18 and source code driver memory 20. Source driver interpreter 24 receives an application configuration file 19 and at least one source code driver 22. The functionality of source driver interpreter 24 can be performed by a computer, such as a main frame, file server, workstation, or any other suitable data processing facility. Using the application configuration file 19 and the source code driver 22, source driver interpreter 24 generates an interface source code 28 for the computing application associated with the particular application configuration file 19. The interface source code 28 includes both code that allows interface with the computing application and code that relates the interface to a business object specific to the application. The source code 28 enables the functionality of the dialog interface. Because the dialog interface is related to the business object, commands received at the dialog interface cause the computing application to operate upon the business object associated with the dialog interface.

The source code 28 generated by source driver interpreter 24 comprises special comments designating or marking places in which the programmer can add additional source code. Each time the source code 28 for a particular computing application is regenerated by source driver interpreter 24, the additional source code added by the programmer will be included in the regenerated source code 28 at the same marked places. This permits the programmer to add functionality to the computing application beyond that which was specified in the application configuration file 19.

The generation of source code may be repeated so that a separate interface source code 28 is generated for each application configuration file 19 in application configuration file memory 18. Thus, interface source codes 28a through 28c may be generated in response to application configuration files 19a through 19c, respectively. Accordingly, interface source code 28a may include interface and relating code for an automated accounting system. Interface source code 28b may include interface and relating code for a video production system. Similarly, interface source code 28c may include interface and relating code for a hazardous chemical monitoring system.

An interface source code memory 26, coupled to source driver interpreter 24, receives and stores the interface source codes 28 generated by source driver interpreter 24.

As is typical of programming environments using an interface source code generator, an interface, such as second interface 30, can receive additional source code or be used to edit existing source code for one or more computing applications. The additional source code may comprise source code implementing the operational features of one or more computing applications.

An edited source code memory 32 is coupled to second interface 30. Edited source code memory 32 can reside in a suitable storage medium, such as RAM, ROM, disk, tape storage, or other suitable volatile or non-volatile data storage system. Edited source code memory 32 stores additional or edited source codes 34a through 34c. A separate set of additional or edited source code 34 can be maintained for each computing application. For example, additional or edited source codes 34a, 34b, and 34c may correspond to applications for the automated accounting system, the video production system, and the hazardous chemical monitoring system, respectively.

A compiler 36 is coupled to interface source code memory 26 and edited source code memory 32. The functionality of compiler 36 can be performed by a computer, such as a mainframe, a file server, a workstation, or any other suitable data processing facility. For each computing application, compiler 36 combines the appropriate interface source code 28 and additional or edited source code 34 into a combined source code 39. For example, interface source code 28a may be combined with additional or edited source code 34a into a combined source code 39a for the automated accounting system. Similarly, interface source code 28b may be combined with additional or edited source code 34b into a combined source code 39b for the video production system. Interface source code 28c may be combined with additional or edited source code 34c into a combined source code 39c for the hazardous chemical monitoring system.

Each combined source code 39 is executable. A combined code memory 38, coupled to compiler 36, stores the combined source code 39. Combined code memory 38 may reside in a suitable storage medium, such as RAM, ROM, disk, tape storage, or other suitable volatile or non-volatile data storage system.

System 10 may operate on one or more computers, shown generally as computer 40. Computer 40 maintains and executes the instructions to implement the generation of source code for an application. Computer 40 includes an input device 42, such as a keypad, touch screen, or other device that can accept information. An output device 44 conveys information associated with the operation of system 10 including digital data, visual information or audio information. Both input device 42 and output device 44 may include fixed or removable storage media, such as magnetic computer disk, optical disk, CD/ROM, or other suitable media to both receive output from and provide input to system 10. One or more processors 46 and their associated memories execute instructions and manipulate information in accordance with the operation of system 10 described below.

FIG. 2 illustrates the relation of a dialog interface with a business object to provide interfacing capability and operating functionality in an exemplary computing application, shown in this particular example as a video production system 47. Source code allows a user of video production system 47 to control a video camera 82 (represented by a camera business object 54) of the video production system using a dialog interface 60, as described below in more detail. System 10 can be used to automatically generate the source code which relates dialog interface 60 with the associated business object representing camera 82.

Source code can be generated for a camera dialog object 48 to implement dialog interface 60, thereby allowing a user to interface with video production system 47. Camera dialog object 48 includes a plurality of execution behaviors 50a through 50f. Execution behaviors 50a through 50f may include such behaviors as constructing dialog interface 60 from a dialog resource included in the executable code for video production system 47, displaying dialog interface 60 on a computer screen 62, presenting controls on the computer screen which the user can use to interact with the application, and changing data in dialog interface 60 in accordance with responses received from a user of video production system 47. Camera dialog object 48 may also include a plurality of variables 52a through 52e defining data elements needed for the execution of behaviors 50a through 50f. Some of these data elements may be copies of or pointers to business objects, such as camera business object 54, described below. Camera dialog object 48 is representative of an interface object that is typical in Windows™-type applications, implementing Windows™-type interface elements, such as a window, a dialog, a control, a tool bar, a menu, a status bar, or any other item which can be displayed on a computer screen to allow a user to interact with a computing application.

Source code for business objects, such as camera business object 54, is also required for video production system 47. Camera business object 54 comprises the software representation of physical camera 82, which can be electronically coupled to and controlled by a computer system running video production system 47 and displaying dialog interface 60. Business objects implement the operational functionality of video production system 47, such as, for example, zooming camera 82. Like camera dialog object 48, camera business object 54 includes a plurality of execution behaviors 56a through 56f. Each execution behavior 56a through 56f relates to an operational feature of the application, such as zooming camera 82 in or out, focusing camera 82, or panning camera 82 left or right. Camera business object 54 also includes a plurality of variables 58a through 58d, which define data elements needed for the execution of behaviors 56a through 56f. Variables 58 may be define, for example, the position of camera 82 or the name assigned to camera 82. Execution behaviors 56 act upon variables 58 to establish the operation of video production system 47.

Camera dialog object 48 may contain one or more references to camera business object 54. Thus, information associated with variables 58a through 58d in camera business object 54 can be displayed to the user. For example, the name assigned to camera 82 (e.g., "Camera 1") can be stored in camera business object 54 and displayed on dialog interface 60. Also, the references between camera dialog object 48 and camera business object 54 allow messages to be sent to camera business object 54 in response to actions of the user. For example, when a user presses the appropriate button in dialog interface 60, camera business object 54 may be sent a message to focus camera 82.

According to the present invention, an application configuration file 19 can be produced and maintained for camera dialog object 48. The application configuration file 19 may comprise one or more objects and the choices for attributes relating to camera dialog object 48. System 10 may use one or more source code drivers 22 to automatically generate source code from the application configuration file 19, such source code relating camera dialog object 48 to camera business object 54.

After the source code for camera dialog object 48 and camera business object 54 has been developed and combined with additional source code for the video production system 47 through the use of system 10 shown in FIG. 1, the application can be executed. Dialog interface 60 may be generated on a suitable output device, such as, for example, computer screen 62. As shown in FIG. 2, dialog interface 60 includes pan/tilt buttons 64, zoom buttons 66 and focus buttons 68. Dialog interface 60 also includes additional buttons, such as "CLOSE" button 70 and "HELP" button 72. Also displayed on screen 62 is a pointer 74 which may be moved about screen 62 through cursor keys, a mouse, or similar pointing device (not shown).

Dialog interface 60 allows a user of video production system 47 to control certain functions of camera 82 by pointing and clicking the buttons on dialog interface 60 through the use of a pointing device such as a mouse, trackball, or joystick. For example, when cursor 80 is moved over pan/tilt buttons 64, camera 82 is panned or tilted. Likewise, when cursor 80 is moved over zoom buttons 66, camera 82 is zoomed in and out. When pan/tilt, focus, and zoom have been adjusted as desired by a user of the application, cursor 80 can be moved over CLOSE button 70. If the user needs help, cursor 80 can be moved over HELP button 72. Consequently, the interface and operation of the video production system 47 are tied together by the source code generated by system 10.

FIG. 3 illustrates a method 100 by which system 10 generates source code for relating a dialog interface with an associated business object in a computing application. Method 100 starts at step 102 where an attribute definition file 16 is received at first interface 12. Attribute definition file 16 comprises information relating to a dialog interface and an associated business object. This includes information relating to the kinds of objects for which source code can be generated (e.g., windows, dialogs, controls, and functions), the attributes which the programmer can specify about those objects, and the options from which the programmer can choose in specifying the attributes. This information can be used produce one or more application configuration files 19 in the subsequent steps. The information can be stored in attribute definition file memory 14.

At step 106, system 10 receives configuration information for the dialog interface and corresponding controls to relate the dialog to its associated business object. The configuration information may include various parameters, declarations, and definitions for the dialog interface, the controls within the dialog interface, and the classes of business objects on which operations are performed using a dialog interface. For a video production system computing application, exemplary classes include a camera class and a video cassette recorder class. The configuration information can be used to produce one or more application configuration files 19. Application configuration files 19 comprise encoded information which can be used to generate source code for the computing applications.

The process for receiving an attribute definition file 16 and configuring the dialog and its associated controls is described below in more detail with reference to FIG. 4.

At step 108, system 10, via object interface 12, receives configuration information for any interfaces which can be used to call the interface dialog. This configuration information may comprise parameters and other information specifying actual business objects on which operations can be performed. These actual business objects may fall within corresponding classes specified by the parameters received at step 106. This configuration information for calling interfaces can be included in the application configuration files 19. The step of configuring the calling interfaces is described below in more detail with reference to FIG. 5. Each application configuration file 19 can be stored and maintained in application configuration file memory 18.

Source driver interpreter 24 receives a source code driver 22 from source code driver memory 20 at step 110. The source code driver 22 may be used for automatically generating source code in response to an application configuration file 19 to relate the dialog interface with its associated business object. Source driver interpreter 24 then generates interface source code 28 using the retrieved source code driver 22 and an application configuration file 19 at step 112. The interface source code 28 may include interface code for the dialog and relating code that relates the dialog to the associated business object. The generated interface source code 28 can be stored in interface source code memory 26.

At step 114, additional source code or edits to existing source code for the particular computing application are received at second interface 30. The additional or edited source code may include source code for implementing the operational features of the computing application. The additional or edited source code 34 is stored in edited source code memory 32.

Compiler 36 retrieves the additional or edited source code 34 and corresponding interface source code 28 for the computing application. Compiler 36 then combines the interface source code 28 and the additional or edited source code 34 to produce executable combined code 39 at step 116. The executable combined code is stored in combined code memory 38. The combined source code 39 can then be executed to implement interface and operational features of the computing application.

At step 118, system 10 determines whether a programmer desires to make changes to the interface source code. If so, system 10 receives changes at step 120. System 10 then returns to step 106 where configuration information for the dialog and its associated controls is received at first interface 12. System 10 then repeats steps 106 through 116 until executable source code is produced for the computing application. Because the source code is generated, any changes in the interface source code will be reflected consistently throughout.

FIG. 4 illustrates a flow chart of a method 200, corresponding to steps 102 and 106 in FIG. 3, by which system 10 receives an attribute definition file and configures an interface dialog and one or more controls within the dialog. Method 200 begins at step 202 where a dialog resource is created. Generally, the dialog resource comprises the image of the dialog interface as it will appear in a computing application when called.

The business object associated with the dialog interface is specified at step 204. The business object may be an item upon which the computing application operates. The dialog interface allows a user of the computing application to operate, command, modify, or direct the associated business object.

At step 206, a user of system 10, via interface 12, specifies whether the dialog interface functions to directly control the business object or serves as a scratch copy for inputting or modifying information relating to the business object. If a dialog interface directly controls the business object, commands entered into the dialog interface cause the computing application to operate in real time upon the business object. For example, with reference to FIG. 2, commands entered on zoom button 60 may actually cause camera 82 to zoom at the time the button is "clicked." If the dialog interface is a scratch copy, then commands entered into the dialog interface do not affect the business object at the time the commands are entered. Rather, as explained below, the commands are effective only when the dialog interface is closed, if at all.

At step 208, system 10 determines whether the dialog has been specified as a copy. If so, a copying alternative for the scratch copy is specified at step 210. Under one alternative, the dialog interface inherits from the business object. Under another alternative, the dialog interface points to the business object. Under yet another alternative, the dialog interface contains a copy of the business object.

At step 212, an alternative for passing the represented business object to the dialog is specified. These passing alternatives can include passing a constant reference to an object, passing a reference, or not passing an object at all.

If scratch copy was previously selected, the types of any additional parameters necessary for copying are specified at step 214. These parameters, which are necessary for copying the represented business object when creating the scratch copy, specify choices of how the object should be copied. For example, one choice may be whether to make a deep copy or a shallow copy.

The types of other parameters for constructing the dialog are specified at step 216. These parameters are needed to create the appearance of the dialog and may also specify additional types or classes of business objects needed by the dialog. In addition, these parameters are supplied to the dialog so that the dialog interface's functionality is enabled. For example, in a video production system, a dialog can be used to edit segments on a video cassette tape. In such case, the dialog may represent a tape segment, but may require additional objects from a tape class or a video cassette recorder class.

At step 218, it is specified whether changes made in a scratch copy of the business object should be copied to the original as the dialog is closed. Several alternatives are available for this function. Under one alternative, the scratch copy will be copied to the original only if an "OK" button on the dialog is clicked. In another alternative, copying is performed in all cases except if a "CANCEL" button is clicked. In yet another alternative, the scratch copy is always copied back as the original. In another alternative, the scratch copy is not copied at all.

It is determined whether the dialog should inherit from another dialog at step 220. If the dialog should inherit from another dialog, then at step 222, the base dialog from which to inherit is specified. All the resources for the controls for the new dialog are specified in the dialog resource created in step 202, but the controls which have the same functionality as controls in the base dialog can inherit code from the base dialog. That way, the new dialog can share the functionality of the base dialog even if its appearance changes. The controls which should be inherited from the base dialog are specified at step 224.

The controls associated with the dialog interface are then configured. The controls can be buttons, list boxes, or any other suitable control. For each control in the dialog interface which will be manipulated by the program, a control object is specified at step 226, thus allowing the control to be manipulated in operation.

A control class is specified for each control at step 228. The general control classes correspond to the various types of controls. General control classes may include a button class, a list box class, a combo box class, a static control class, and other classes representing standard controls. Other control classes can be sub-classes of the general control classes. An exemplary specialized sub-class may be a momentary button, which responds as long as it is "held down" by the user. In one embodiment, the class for a control defaults to a general control class for that control. A specialized sub-class may then be specified if desired.

For each control, at step 230, a user may specify the events to which the control will respond. Such events include a single click over the control, a double click over the control, keying of information, or any other suitable event.

After the interface dialog and its associated controls have been configured according to method 200, one or more source code drivers 22 can be used for automatically generating source code in response to relate the dialog interface with its associated business object.

FIG. 5 illustrates a flow chart of a method 300, corresponding to step 108 in FIG. 3, by which system 10 configures interface objects for calling an interface dialog. Method 300 is repeated for each interface object which can be used to call the dialog interface. Method 300 starts at step 302 where the dialog class to be called by an interface object is specified.

The actual business object to be passed for use with the dialog interface is specified at step 304. This step, which is associated with step 212 in FIG. 4 for passing the represented business object to the dialog interface, relates the dialog interface to the business object.

At step 306, the specific parameters needed to copy the object are specified. This step is associated with step 214 in FIG. 4 where the types of parameters necessary for copying are specified. In contrast to step 214, these parameters specify the actual parameters rather than the type of the parameters.

Next, at step 308, a user of system 10 may specify the actual additional parameters used to construct the dialog. These additional parameters correspond to the parameters whose types are specified at step 216 in FIG. 4. In contrast to step 216, these parameters specified at step 308 specify the actual parameters rather than the types of parameters. For example, in a video production system computing application, the parameters for specific calls being configured by method 300 may specify business objects such as tape A, tape B, or tape C, as opposed to tape class. In an accounting entry computing application, the parameters may specify accounting entry X, accounting entry Y, or accounting entry Z, as opposed to accounting entry class.

At step 310, it is specified whether the scratch copy should be copied to the original after the dialog is closed. This step is similar to step 218 in FIG. 4. However, in step 310, the user specifies whether copying is accomplished after the dialog is closed as opposed to step 218 where the user specifies whether copying is accomplished when the dialog is closed.

After the calling interface objects have been configured according to method 300, one or more source code drivers 22 can be used for automatically generating source code in response to relate the dialog interface which is called with its associated business object.

Although the present invention and its advantages have been described in detail, it should be understood that variations changes, substitutions, and alterations can be made therein without departing from the spirit and scope of the invention as defined by the appended claims.

What is claimed is:

1. A method for automatically generating source code for relating a dialog interface with a business object in a computing application, comprising the steps of:
   receiving at least one dialog and control configuration;
   receiving at least one calling interface object configuration; and
   automatically generating source code in response to the received dialog and control configuration and the calling interface object configuration to relate the dialog interface with the business object.

2. The method of claim 1, wherein the step of receiving at least one dialog and control configuration comprises the steps of:
   creating a dialog resource; and
   specifying a business object.

3. The method of claim 1, wherein the step of receiving at least one dialog and control configuration comprises the step of specifying a control object for each control within the dialog interface.

4. The method of claim 1, further comprising the step of receiving an attribute definition file.

5. The method of claim 4, further comprising the step of storing the attribute definition file in a memory.

6. The method of claim 1, further comprising the step of receiving an application configuration file.

7. The method of claim 6, wherein the step of automatically generating source code comprises generating source code from the application configuration file with a source code driver.

8. The method of claim 1, wherein the step of receiving at least one dialog and control configuration comprises the step of specifying at least one event to which a control will respond.

9. The method of claim 1, wherein the step of automatically generating source code comprises the step of generating source code using a source code driver.

10. The method of claim 1, wherein the step of receiving at least one dialog and control configuration further comprises the step of specifying a dialog from which to inherit.

11. The method of claim 1, wherein the step of receiving at least one dialog and control configuration further comprises the step of specifying a control from which to inherit.

12. A method performed on a computer system for automatically generating source code for a computing application, comprising the steps of:
   receiving configuration information specifying a relationship between at least one interface object and at least one business object which is represented by the interface object; and
   automatically generating source code from the configuration information.

13. The method of claim 12, wherein the step of receiving configuration information further comprises the step of receiving an application configuration file.

14. The method of claim 12, wherein the step of generating source code comprises the step of generating source code from the application configuration file.

15. The method of claim 12, wherein the step of receiving configuration information further comprises the step of creating a dialog resource.

16. The method of claim 12, wherein the step of receiving configuration information further comprises the steps of:
   receiving at least one dialog and control configuration; and
   receiving at least one calling interface object configuration.

17. The method of claim 12, wherein a source code driver is used to generate source code.

18. The method of claim 12, wherein the step of receiving configuration information further comprises the step of specifying a dialog from which to inherit.

19. A system for generating source code for relating a dialog interface with a business object in a computing application, comprising:
   a memory operable to store an attribute definition file;
   an interface coupled to the memory and operable to allow a user of the system to create an application configuration file from the attribute definition file; and
   a processor coupled to the memory and the interface, the processor operable to automatically generate source code in response to the application configuration file to relate the dialog interface with the business object.

20. The system of claim 19, wherein the memory is further operable to store at least one source code driver.

21. The system of claim 19, wherein the processor is further operable to compile the source code.

22. The system of claim 19, wherein the memory is further operable to store the application configuration file.

23. The system of claim 19, wherein the application configuration file comprises at least one dialog and control configuration and at least one calling interface object configuration.

\* \* \* \* \*